(12) United States Patent
Botke et al.

(10) Patent No.: US 6,422,357 B1
(45) Date of Patent: Jul. 23, 2002

(54) BRAKING APPARATUS

(75) Inventors: Matthew Murray Botke, Santa Barbara, CA (US); David P. Cadogan; John Kun Hung Lin, both of Middletown, DE (US)

(73) Assignees: ILC Dover, Inc., Frederica, DE (US); AEC-Able Engineering Co., Goleta, GA (US)

( * ) Notice: Subject to any disclaimer, the term of this patent is extended or adjusted under 35 U.S.C. 154(b) by 0 days.

(21) Appl. No.: 09/566,983

(22) Filed: May 9, 2000

(51) Int. Cl.$^7$ ................................................ F16D 63/00
(52) U.S. Cl. ......................... 188/84; 188/83; 242/423.1
(58) Field of Search ............................ 188/83, 130, 84, 188/62.7, 82.77; 267/273, 277, 284, 154; 242/423, 423.1, 423.2

(56) References Cited

U.S. PATENT DOCUMENTS

| | | | | |
|---|---|---|---|---|
| 1,976,943 A | * | 10/1934 | Klausmeyer | .................... 77/28 |
| 3,632,062 A | * | 1/1972 | Sole | ........................ 242/147 R |
| 4,029,267 A | * | 6/1977 | Slipper | .................... 242/107.4 |
| 4,114,874 A | * | 9/1978 | Mattila | ........................ 272/71 |
| 4,123,197 A | * | 10/1978 | Keem et al. | .................. 415/123 |
| 4,646,984 A | * | 3/1987 | Falstrup | .................... 242/54 R |
| 5,938,142 A | * | 8/1999 | Halperin | .................. 242/423.1 |

OTHER PUBLICATIONS

"Deployment Control Mechanisms for Inflatable Space Structures" David P. Cadogan and Mark S. Grahne (http://175.4.112.1115/Products/SpaceInf/Tech.htm).
"Inflatable Deployable Space Structures Technology Summary" R. E. Freeland, G.D. Bilyeu, G.R. Veal, M. M. Mikulas (http://www.lgarde.com/people/papers/spacestructs.html).

\* cited by examiner

*Primary Examiner*—Robert J. Oberleitner
*Assistant Examiner*—Bradley King
(74) *Attorney, Agent, or Firm*—Stevens, Davis, Miller & Mosher, L.L.P.

(57) ABSTRACT

A braking apparatus for imparting constant mechanical torque to effect a braking action is capable of operating in a constant, smooth, and adjustable manner, yet operates essentially independent of friction and temperature, as well as independent of rotational speed. The braking apparatus includes a hub assembly having a hub, a collar, a plurality of torsional springs, a spring cap, a spring bushing, and damping means, and a sprocket assembly having a sprocket, a hub bearing, a retaining ring, and a plurality of roller assemblies each of which has a roller. The sprocket assembly is rotatably connected to the hub assembly by a hub assembly spring, a sprocket assembly spring, an adjustment cap, and an adjustment means. The apparatus provides braking by releasably contacting at least one of each of the rollers with at least one of each of the torsional springs so as to deflect and then release the torsional spring as the sprocket assembly rotates about the hub assembly. The braking action is effected by transferring the energy of the rotating sprocket assembly into the oscillation of the torsional springs, and then from spring oscillation into heat by means of damping. The braking apparatus accomplishes a consistent braking torque essentially independent of friction by first loading the torsional spring, then decoupling the loaded spring from the braking torque. The decoupled spring is then allowed to dissipate its stored energy by self-damped oscillation at a rate that does not affect the braking torque. A specific degree of braking is provided by employing the adjustment means to adjust the separation distance between the sprocket assembly and the hub assembly, and thus the separation distance between the rollers and the torsional springs, thereby adjusting the amount of engagement between the rollers and the torsional springs. Applications of the braking apparatus include any service in which a compact, lightweight, mechanically reliable, smoothly-operating, and adjustable braking apparatus is required.

3 Claims, 4 Drawing Sheets

BRAKING APPARATUS

BACKGROUND OF THE INVENTION

1. Field of the Invention

This invention relates generally to an apparatus for imparting mechanical torque to effect a braking action. The invention relates more specifically to an apparatus which effects the braking action by transferring the energy of a rotating sprocket into spring oscillation, and then from spring oscillation into heat by means of damping.

2. Description of Related Art

Various conventional devices are known for imparting mechanical torque to effect a braking action. Such devices include, for example, Prony brakes and disc brakes.

Many of the aforementioned conventional devices, however, suffer from various drawbacks, including bulkiness, excessive weight, a general lack of mechanical reliability, and insufficient flexibility for use in wide variety of applications. Most importantly, however, these devices are characterized by a direct reliability upon friction to effect the braking torque.

Therefore, a general need exists for an apparatus capable of imparting mechanical torque to effect a braking action, wherein the apparatus is compact, lightweight, mechanically reliable, and has sufficient flexibility for use in a variety of applications. A more specific need exists for an apparatus capable of imparting constant mechanical torque to effect a braking action, wherein the operation of the apparatus should be essentially independent of friction and temperature, as well as independent of rotational speed.

SUMMARY OF THE INVENTION

It is an object of the present invention to provide an apparatus for imparting constant mechanical torque to effect a braking action. It is a further object of the present invention to provide an apparatus to effect the braking action which is compact, lightweight, and mechanically reliable, has sufficient flexibility for use in a variety of applications, and is capable of effecting the braking in a constant, smooth, and adjustable manner. It is a still further object of the present invention to provide the aforementioned apparatus wherein the operation of the apparatus is essentially independent of friction and temperature, as well as independent of rotational speed.

Accordingly, the present invention advantageously employs an apparatus which effects the braking action by transferring the energy of a rotating sprocket into spring oscillation, and then from spring oscillation into heat by means of damping.

The braking apparatus comprises a hub assembly having a hub, a collar, a plurality of torsional springs, a spring cap, a spring bushing, and damping means, and a sprocket assembly having a sprocket, a hub bearing, a retaining ring, and a plurality of roller assemblies each of which has a roller. The sprocket assembly is rotatably connected to the hub assembly by a hub assembly spring, a sprocket assembly spring, an adjustment cap, and an adjustment means.

The apparatus provides braking by releasably contacting at least one of each of the rollers with at least one of each of the torsional springs so as to deflect and then release the torsional spring as the sprocket assembly rotates about the hub assembly. The braking apparatus accomplishes a consistent braking torque essentially independent of friction by first loading a torsional spring, then decoupling the loaded spring from the braking torque. The decoupled spring is then allowed to dissipate its stored energy by self-damped oscillation at a rate that does not affect the braking torque.

A specific degree of braking is provided by employing the adjustment means to adjust the separation distance between the sprocket assembly and the hub assembly, and thus the separation distance between the rollers and the torsional springs, thereby adjusting the amount of engagement between the rollers and the torsional springs, and thus the amount of spring loading.

The present invention, therefore, is advantageously suitable for use in any service in which a compact, lightweight, mechanically reliable, smoothly-operating, and adjustable braking apparatus is required.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be disclosed in terms of the currently perceived preferred embodiments thereof.

Figure 1:
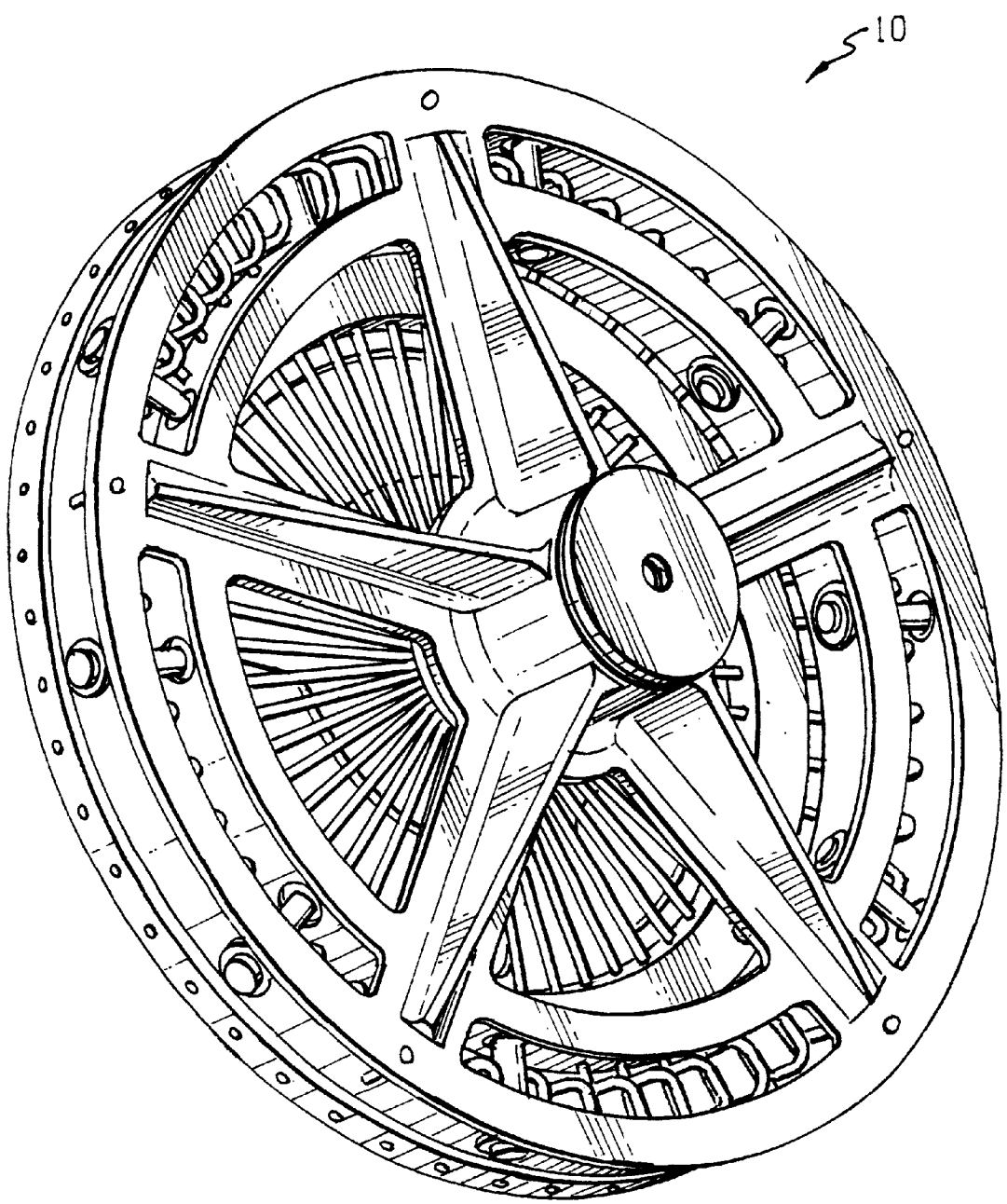
FIG. 1 is a perspective view of a braking apparatus according to a preferred embodiment of the present invention.
Figure 2:
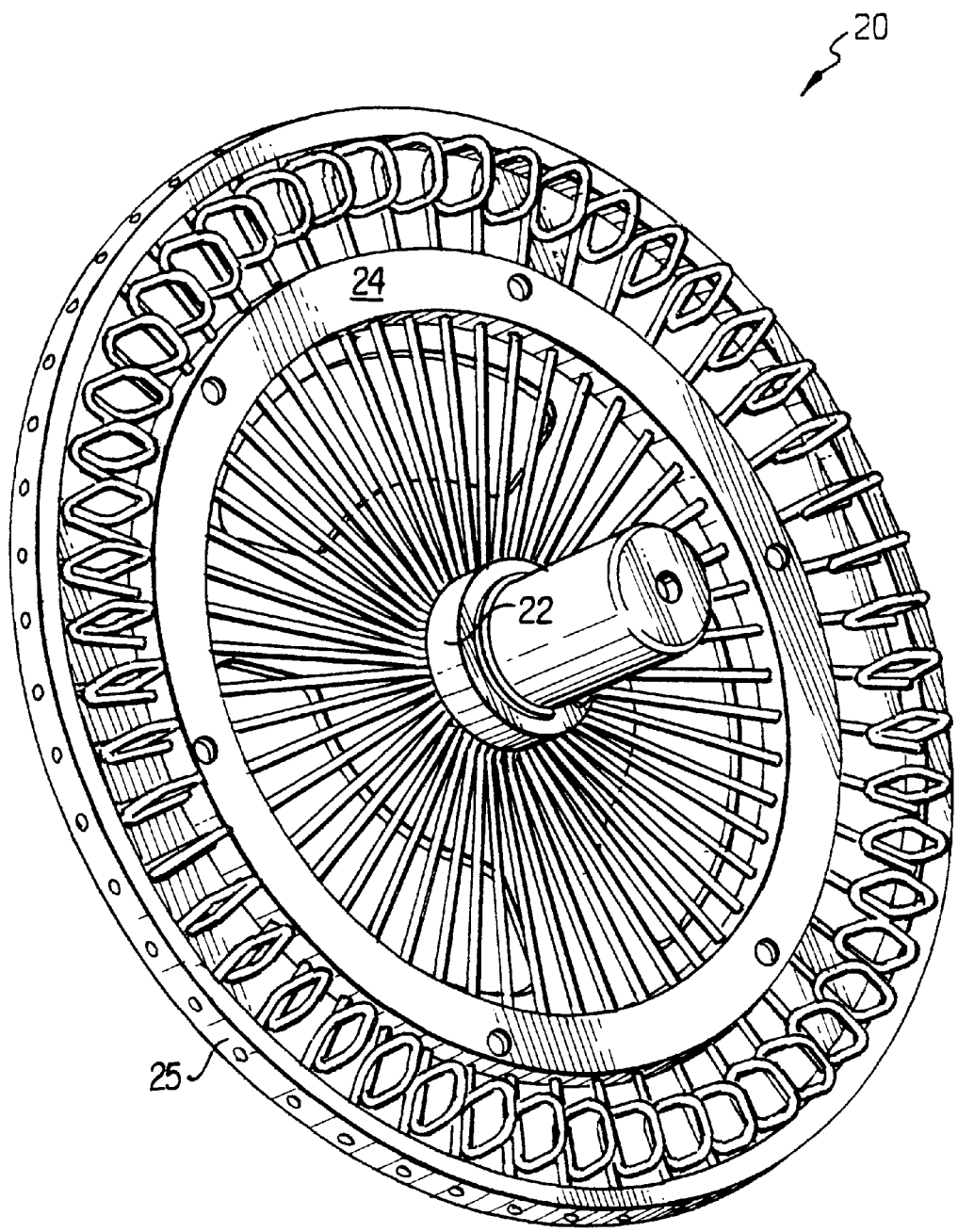
FIG. 2 is a perspective view of a hub assembly of the braking apparatus.
Figure 3:
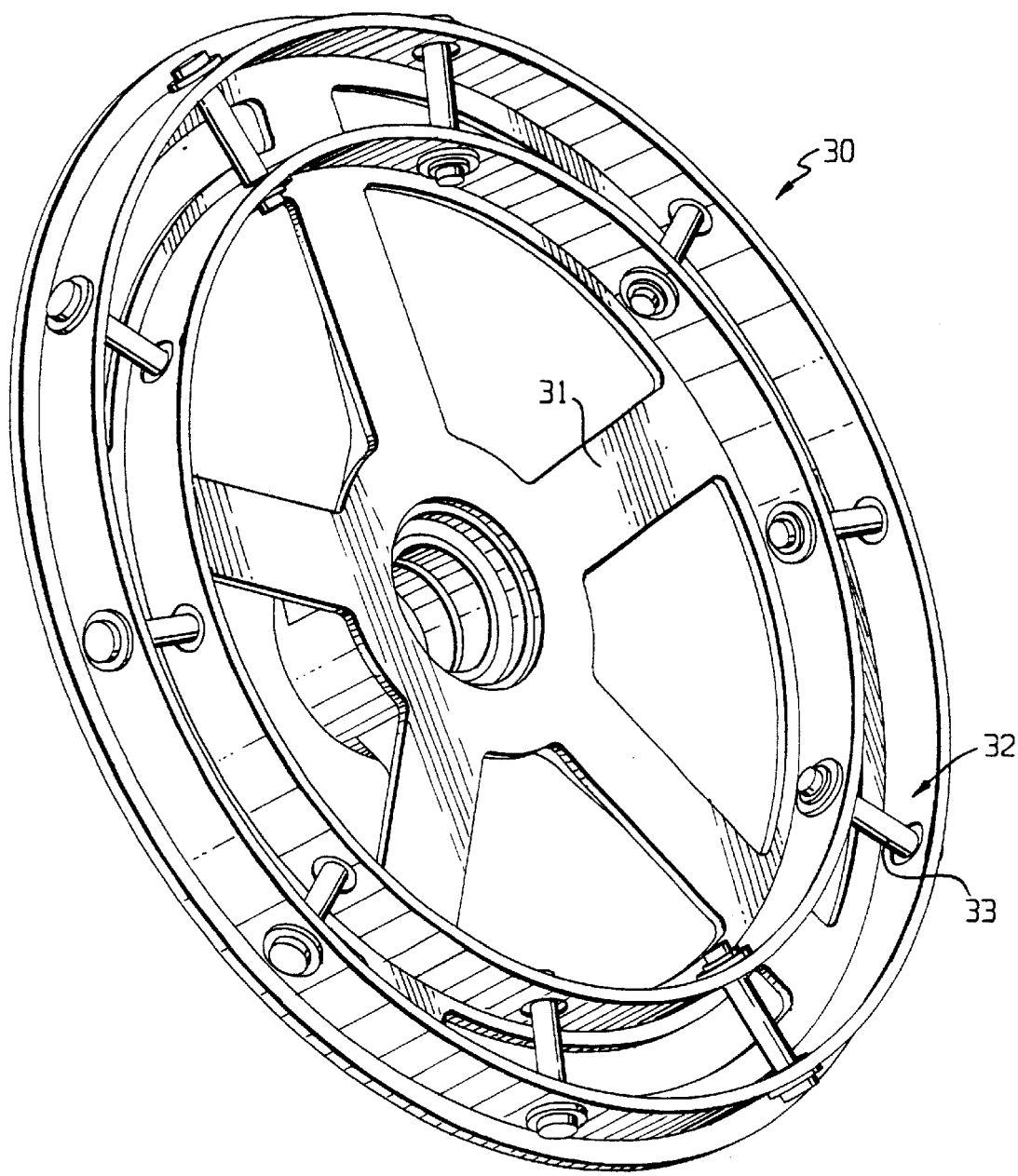
FIG. 3 is a perspective view of a sprocket assembly of the braking apparatus.

Referring to FIG. 1, a braking apparatus 10 constructed in accordance with a preferred embodiment of the present invention is shown. The braking apparatus comprises generally a hub assembly 20 (FIG. 2) and a sprocket assembly 30 (FIG. 3). As shown in FIG. 2, the hub assembly 20 includes a hub 21 extending from a collar 22. A plurality of torsion springs 23 have a first end fixed adjacent the collar 22, and a second end rotatably fixed at a second end by a bushing 25. In between the ends of each torsion spring, a spring cap 24 is fixed to the torsion springs 23.

Figure 4:
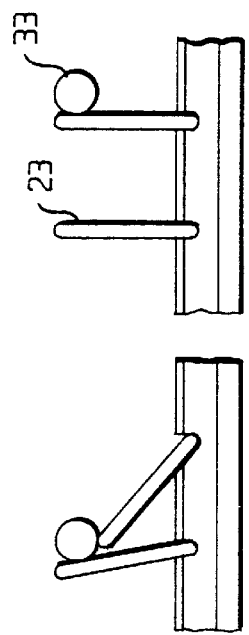
FIG. 4 is a sectional view of the braking apparatus.
Figure 5:
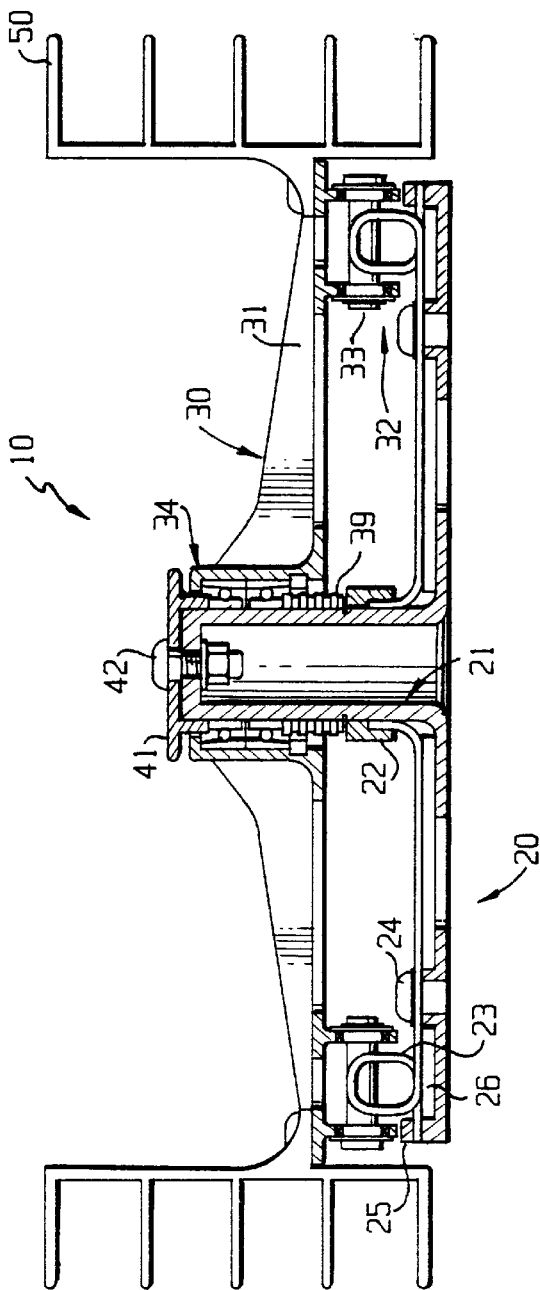
FIG. 5 is a partial sectional view of the braking apparatus depicted in FIG. 4.

As depicted in FIGS. 4 and 5, hub assembly 20 comprises a machined hub 21, a collar 22, a plurality of torsional springs 23, a spring cap 24, a spring bushing 25, and damping means 26. The bottom portion of each of the plurality of torsional springs 23 is held in place by collar 22, spring cap 24, and spring bushing 25.

As also depicted in FIGS. 4 and 5, sprocket assembly 30 comprises a machined sprocket 31, hub bearings 34, a retaining ring (not illustrated), and a plurality of roller assemblies 32. Each of the roller assemblies 32 comprises a roller 33 capable of rotating about its axis as sprocket assembly 30 rotates around hub assembly 20. Rollers 33 and the hub bearing are mounted by means of retaining rings.

Sprocket assembly 30, shown in FIG. 3, is rotatably connected to hub assembly 20 by inserting the hub 21 into the bearing 34 of the sprocket assembly 30. The bearing 34 comprises a cavity formed to receive the hub 21 of the hub assembly 20. A hub assembly spring 39 (illustrated in FIG. 4) is positioned around the hub 21, preferably engaging the collar 22 of the hub assembly 20. The sprocket assembly 30 also includes an adjustment cap 41, a sprocket assembly spring (not shown) and an adjustment means 42. Adjustment cap 41 and adjustment means 42 serve to facilitate the adjustment in separation distance between sprocket assembly 30 and hub assembly 20, When the apparatus 10 is assembled together, as shown in FIG. 4, the hub assembly spring 39 engages the sprocket assembly spring in order to bias the hub assembly 20 away from the sprocket assembly 30.

Figure 6:
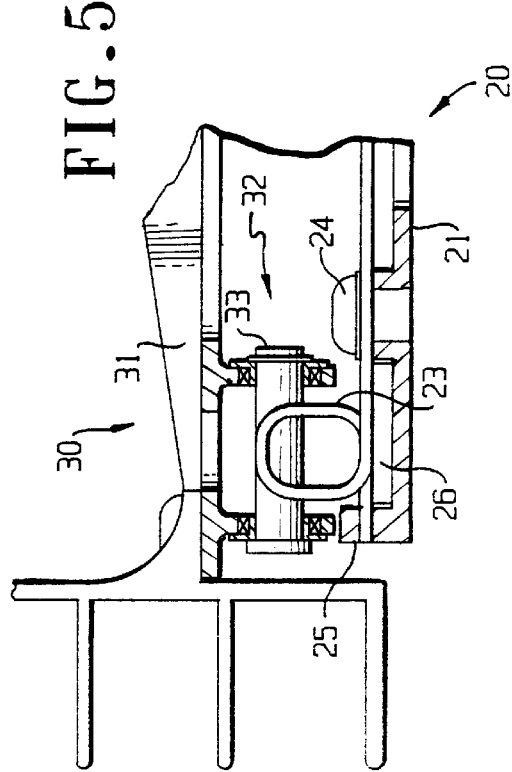
FIG. 6 is a partial side view of the braking operation of the braking apparatus illustrating torsional spring/roller interaction.

As depicted in FIG. 6, the braking apparatus provides braking by releasably contacting at least one of each of the rollers 33 with at least one of each of the torsional springs 23 so as to deflect and then release the torsional spring as the sprocket assembly rotates about the hub assembly.

As indicated above, the bottom portion of each of the plurality of torsional springs 23 is held in place by collar 22, spring cap 24, and spring bushing 25. Each torsional spring 23, therefore, as it is deflected and then released by a roller 33, is free to oscillate, with each spring 23 pivoting around its bushing 25.

Selection of both the materials of construction of the torsional spring 23, and the dimensions of the spring, determine the amount of torque which results from a specific separation distance between sprocket assembly 30 and hub assembly 20.

By virtue of the plurality of roller assemblies and the plurality of torsional springs, and the relative number of each, the braking apparatus is capable of providing a constant, smooth braking motion. In a preferred embodiment, the number of roller assemblies relative to the number of torsional springs is a vernier combination.

The braking action is effected by transferring the energy of rotating sprocket assembly 30 into the oscillation of torsional springs 23, and then from spring oscillation into heat by means of damping. The braking apparatus accomplishes a consistent braking torque essentially independent of friction by first loading a torsional spring, then decoupling the loaded spring from the braking torque. The decoupled spring is then allowed to dissipate its stored energy by self-damped oscillation at a rate that does not affect the braking torque.

Spring oscillation damping is effected by the placement of a suitable damping means 26 between the torsional springs 23 and hub 21. Damping means 26 can include, for example, a material such as a silicone rubber pad, or any other material capable of providing the requisite amount of damping for the specific torsional spring employed.

As indicated above, another advantageous feature of the braking apparatus is that the degree of braking which can be effected is adjustable (i.e., by means of torque adjustment). The torque adjustment is effected by altering the relative positions of the hub assembly 20 and the sprocket assembly 30 (i.e., drawing the sprocket assembly 30 closer to, or moving the sprocket assembly away from, hub assembly 20).

For example, to increase the amount of torque, the adjustment means 42 is actuated so as to draw adjustment cap 41, and thus, sprocket assembly 30, closer to hub assembly 20. This decrease in separation distance between sprocket assembly 30 and hub assembly 20 decreases the separation distance between roller 33 and torsional spring 23, and thus increases the energy dissipation. Conversely, to decrease the amount of torque, the adjustment means 42 is actuated so as to move adjustment cap 41, and thus, sprocket assembly 30, away from hub assembly 20. This increase in separation distance between sprocket assembly 30 and hub assembly 20 increases the separation distance between roller 33 and torsional spring 23, and thus decreases the energy dissipation.

Adjustment means 42 can comprise, for example (as depicted in FIG. 4), a threaded bolt and nut. The desired amount of tension between roller 33 and torsion spring 23 is attained by altering the relative positions of the bolt and nut by rotating the bolt within the nut so as to alter the relative positions of the hub assembly 20 and the sprocket assembly 30. In this embodiment, both the hub assembly spring 39 and the sprocket assembly spring (not shown) must be adequately preloaded, and the sprocket assembly spring must be very stiff relative to the hub assembly spring. In addition, the hub assembly spring 39 should retain enough travel capability such that adjustment of the engagement does not cause the hub assembly spring 39 to bottom-out or lose adequate preload. Adjustment cap 41 is designed to bottom-out on hub 21 prior to configuring the braking apparatus, so as to avoid the possibility of over-stressing the torsional springs 23.

The degree of braking, therefore, is determined primarily by adjustment of the separation distance between sprocket assembly 30 and hub assembly 20. For a particular sprocket assembly 30-to-hub assembly 20 separation distance, the amount of engagement, or resistance, between roller 33 and torsional spring 23 is determined primarily by the materials of construction of the spring (i.e., stiffness), and the dimensions of the spring.

By virtue of its action, the braking apparatus can function in at least two basic modes, a deploying mode and a tensioning mode. In the deploying mode, the braking apparatus travels with the object which is being subjected to the braking. For example, the braking apparatus could be mounted on the deploying end of a deployable spacecraft structure. Sprocket assembly 30 would be attached to the drum of a controlled deployment mechanism, and hub assembly 20 would be connected to the shaft of the deployment mechanism.

In the tensioning mode, the braking apparatus remains in a fixed position, and serves to apply tension to a tensioning means, such as one or a plurality of cables or tapes. In this mode, a cable spool 50 (FIG. 4) would be attached to the outermost circumference of the sprocket assembly 30, and hub assembly 20 would be attached to a fixed point. A first end of each cable would be rotatably attached to the spool, and a second end of each cable would be attached to an object to which tension is to be applied.

The present invention, therefore, provides an apparatus to effect a braking action which is compact, lightweight, and mechanically reliable, has sufficient flexibility for use in a variety of applications, and is capable of effecting the braking in a constant, smooth, and adjustable manner.

By virtue of its ability to function in either a deploying mode or a tensioning mode, the potential applications of the braking apparatus are numerous. For example, as indicated above, in the deploying mode, the braking apparatus could be employed as part of a spacecraft structure controlled deployment system. The braking apparatus is especially compatible with lightweight, deployable spacecraft structures because the apparatus is lightweight, reliable, has a smooth and predictable motion, and is compatible with the numerous materials of construction and configurations associated with such spacecraft structures. In the tensioning mode, the braking apparatus could be employed to impart tension to one or a plurality of cables.

Although the invention has been exemplified as being suitable for use in the deployment of space structures, one skilled in the art can appreciate that the invention could be employed in other environments that require the use of a compact, lightweight, mechanically reliable, smoothly-operating, and adjustable braking apparatus.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

For example, the use of the term "spring" herein is meant to denote not only the torsional spring configuration having the cross section depicted in FIG. 4, but also other configurations which are capable of deflecting upon contact with the roller, and thereby transferring the energy of the rotating sprocket into spring oscillation.

By way of further example of modifications within the scope of this invention, while the means for contacting the torsional springs has been disclosed as a roller, another embodiment could comprise any other means capable of deflecting the spring upon contact, and thereby transferring the energy of the rotating sprocket into spring oscillation.

The description is intended to illustrate and not limit the scope of the invention which is defined by the full scope of the appended claims, and which invention is entitled to protection within the full scope of the appended claims.

What is claimed is:

1. A braking apparatus comprising:

a hub assembly comprising a hub, a collar, a plurality of torsional springs, a spring cap, a spring bushing, and damping means, a sprocket assembly comprising a sprocket, a hub bearing, and a plurality of roller assemblies, each of said roller assemblies comprising a roller, said sprocket assembly being rotatably connected to said hub assembly by a hub assembly spring, an adjustment cap, and an adjustment means, whereby said apparatus provides braking by releasably contacting at least one of said rollers with at least one of said torsional springs so as to deflect and then release said torsional spring as said sprocket assembly rotates about said hub assembly.

2. A braking apparatus according to claim 1, wherein a specific degree of said braking is provided by employing said adjustment means to adjust a separation distance between said sprocket assembly and said hub assembly, thereby adjusting an amount of said releasable contact between said rollers and said torsional springs.

3. A braking apparatus according to claim 1, wherein said damping means is a silicone rubber pad disposed between said plurality of torsional springs and said hub.

* * * * *